United States Patent [19]

Ozawa et al.

[11] Patent Number: 5,655,818
[45] Date of Patent: Aug. 12, 1997

[54] ANTI-SKID CONTROL DEVICE

[75] Inventors: Wataru Ozawa; Iwao Ono; Toyohiko Ishikawa; Koji Sakai, all of Hamakita, Japan

[73] Assignee: Nisshinbo Industries Inc., Tokyo, Japan

[21] Appl. No.: 496,246

[22] Filed: Jun. 28, 1995

[30] Foreign Application Priority Data

Jun. 28, 1994 [JP] Japan ..................... 6-168769

[51] Int. Cl.⁶ ...................................... B60T 8/62
[52] U.S. Cl. ..................... 303/115.1; 303/116.2; 303/DIG. 2
[58] Field of Search ............... 303/115.1, 115.2, 303/116.1, 116.2, 117.1, 119.1, 84.2, 900, DIG. 1, DIG. 2

[56] References Cited

U.S. PATENT DOCUMENTS 5,098,173  3/1992  Beck et al. ............... 303/DIG. 2 X
5,143,428  9/1992  Toda et al. ............... 303/900 X
5,437,501  8/1995  Kohno et al. ............ 303/117.1 X

FOREIGN PATENT DOCUMENTS 9104893  4/1991  WIPO ................. 303/115.4

Primary Examiner—Josie Ballato
Attorney, Agent, or Firm—Nikaido, Marmelstein, Murray & Oram LLP

[57] ABSTRACT

An anti-skid control device is provided that eliminates noise and vibration, provides better pedal responsiveness, and provides better anti-skid control. In the anti-skid control device 1, a pressure regulator valve 4 is positioned in the brake line between the master cylinder 12 and inlet valve 21, and the pressure differential between the input side and output side of the inlet valve 21 is minimized.

4 Claims, 6 Drawing Sheets

ANTI-SKID CONTROL DEVICE

BACKGROUND OF THE INVENTION

1. Field of the Invention

This invention relates to an anti-skid control device for vehicles.

2. Description of the Related Art

In a conventional anti-skid control device, a large pressure differential is generated between the input side and output side of the inlet valve. A small-diameter orifice is inserted into the brake lines to adjust the rate of pressure rise in the brake lines.

Such a conventional anti-skid control device presents the following problems:

1. A large pressure differential is generated between the input side and the output side of the inlet valve, wherein a sudden pressure change occurs upon opening and closing the said valve, causing noise and vibration.
2. The small-diameter orifices in the brake lines create a sensation of throttling during normal braking.
3. The pressure boost with one pulse operation of the inlet valve is too excessive to attain precise anti-skid control.

SUMMARY OF THE INVENTION

One objective of this invention is to provide an anti-skid control device that prevents the generation of noise and vibration. Another objective of this invention is to provide an anti-skid control device that provides better pedal responsiveness during normal braking. A further objective of this invention is to provide an anti-skid control device that accurately controls the hydraulic pressure of the brakes.

These objectives, and other advantages of the invention, are provided by a vehicle anti-skid control device according to the invention wherein a brake line is routed through a master cylinder, an inlet valve, and a wheel cylinder. A means is provided to regulate the pressure at the wheel cylinder such that a pressure differential is generated between an output side of the master cylinder and an input side of the inlet valve.

BRIEF DESCRIPTION OF THE DRAWINGS

The above and other objects and the attendant advantages of the present invention will become readily apparent by reference to the following detailed description, when considered in conjunction with the accompanying drawings, wherein.

DETAILED DESCRIPTION OF THE PREFERRED EMBODIMENTS

An embodiment of this invention is explained below with reference to the attached diagrams.

Figure 3:
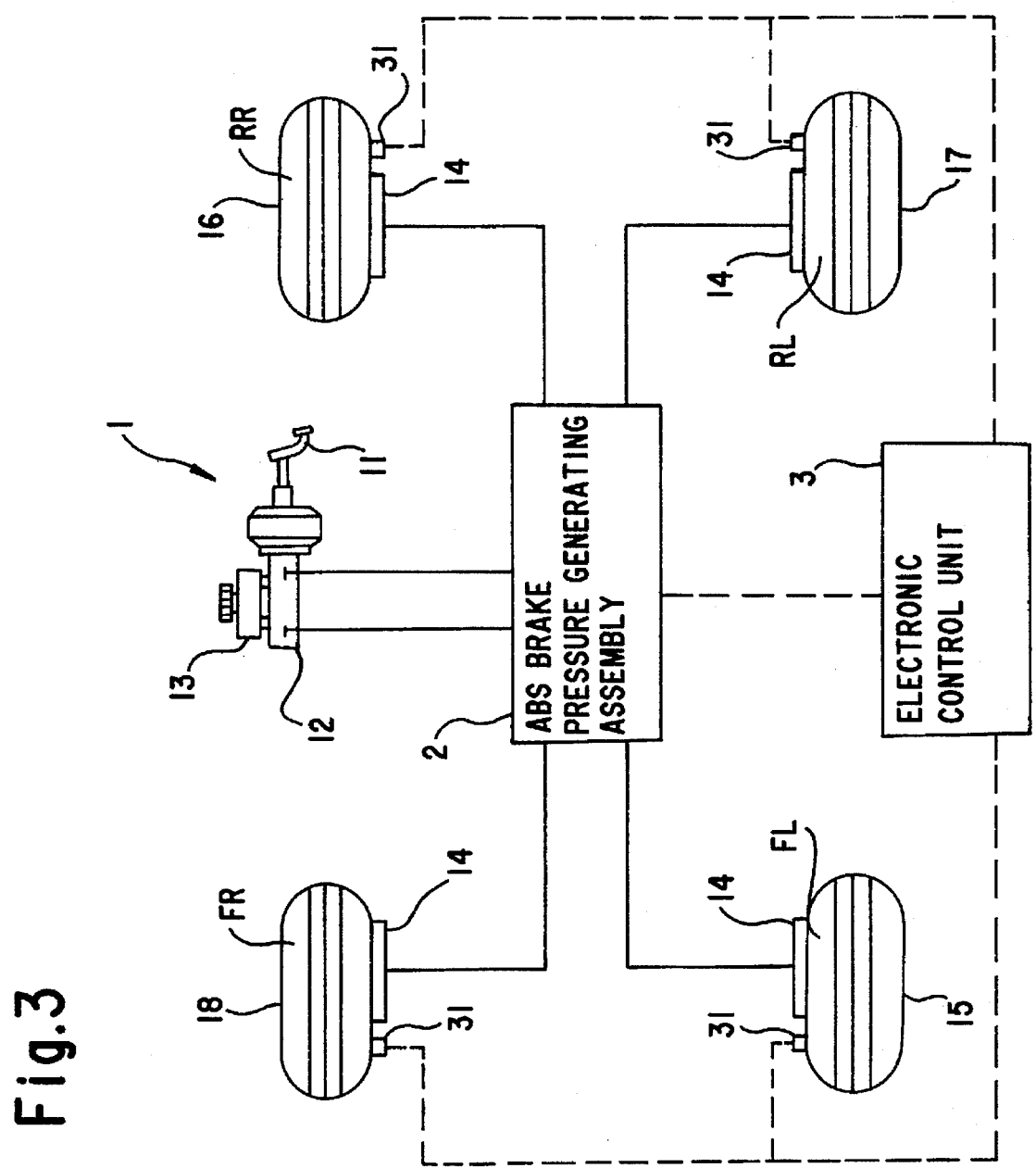
FIG. 3 is a conceptual diagram of the ABS control device.

In the anti-skid (ABS) control device 1 shown in FIG. 3, when the brake pedal 11 is pressed, hydraulic pressure supplied from the main reservoir 13 and generated at the master cylinder 12 is applied through the ABS brake pressure generating assembly 2, to the respective wheel brake 14 of each wheel 15, 16, 17, 18 to brake the vehicle. A wheel speed sensor 31 detects the rotational speed of each wheel and transmits those signals to the electronic control unit 3 which uses that information to compute the rate of deceleration and slip ratio of the wheels. As braking proceeds, should the rate of deceleration of each wheel exceed the threshold value, the electronic control unit 3 drives the brake pressure generating assembly 2 to control the skid of each wheel 15–18.

Figure 1:
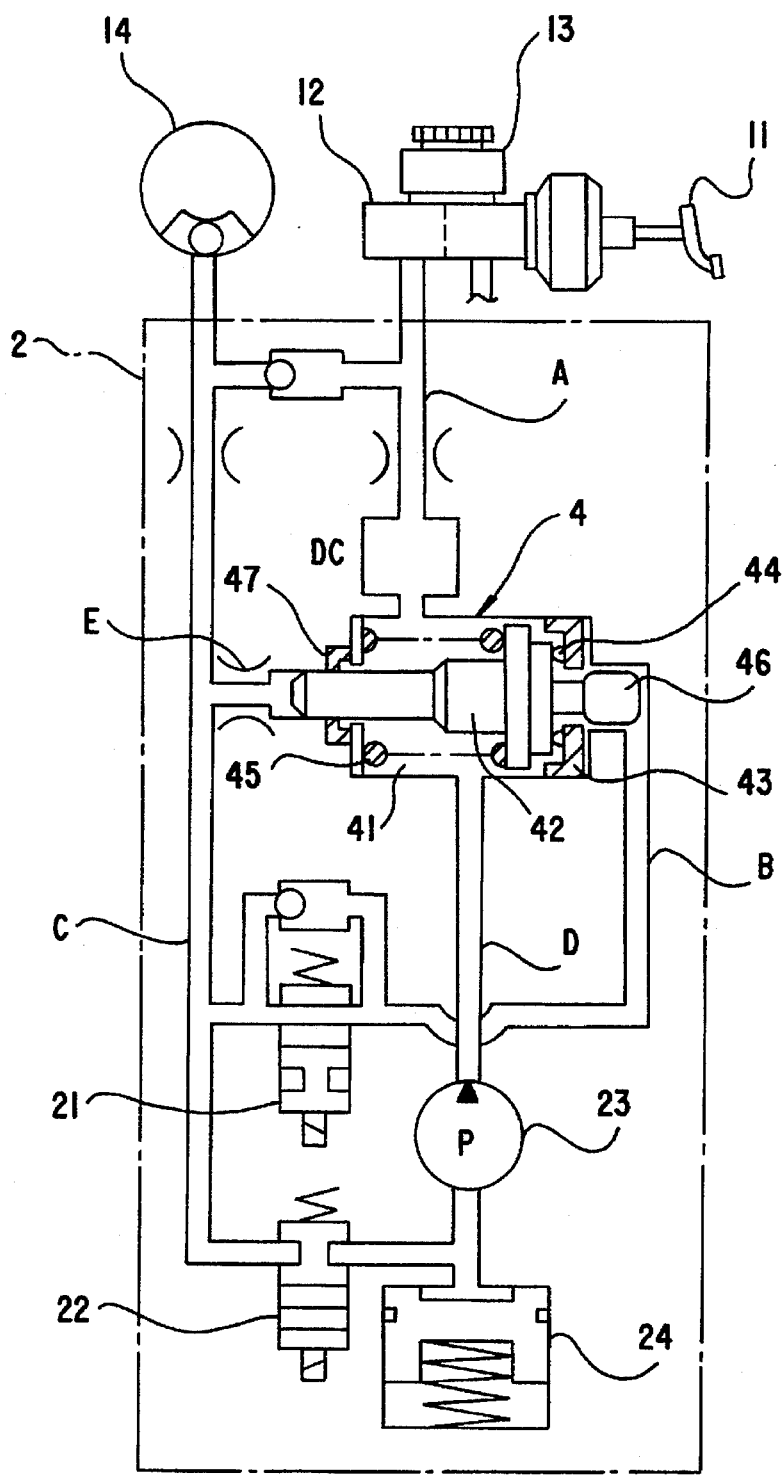
FIG. 1 is an explanatory diagram of the brake lines of the anti-skid control device.
Figure 2:
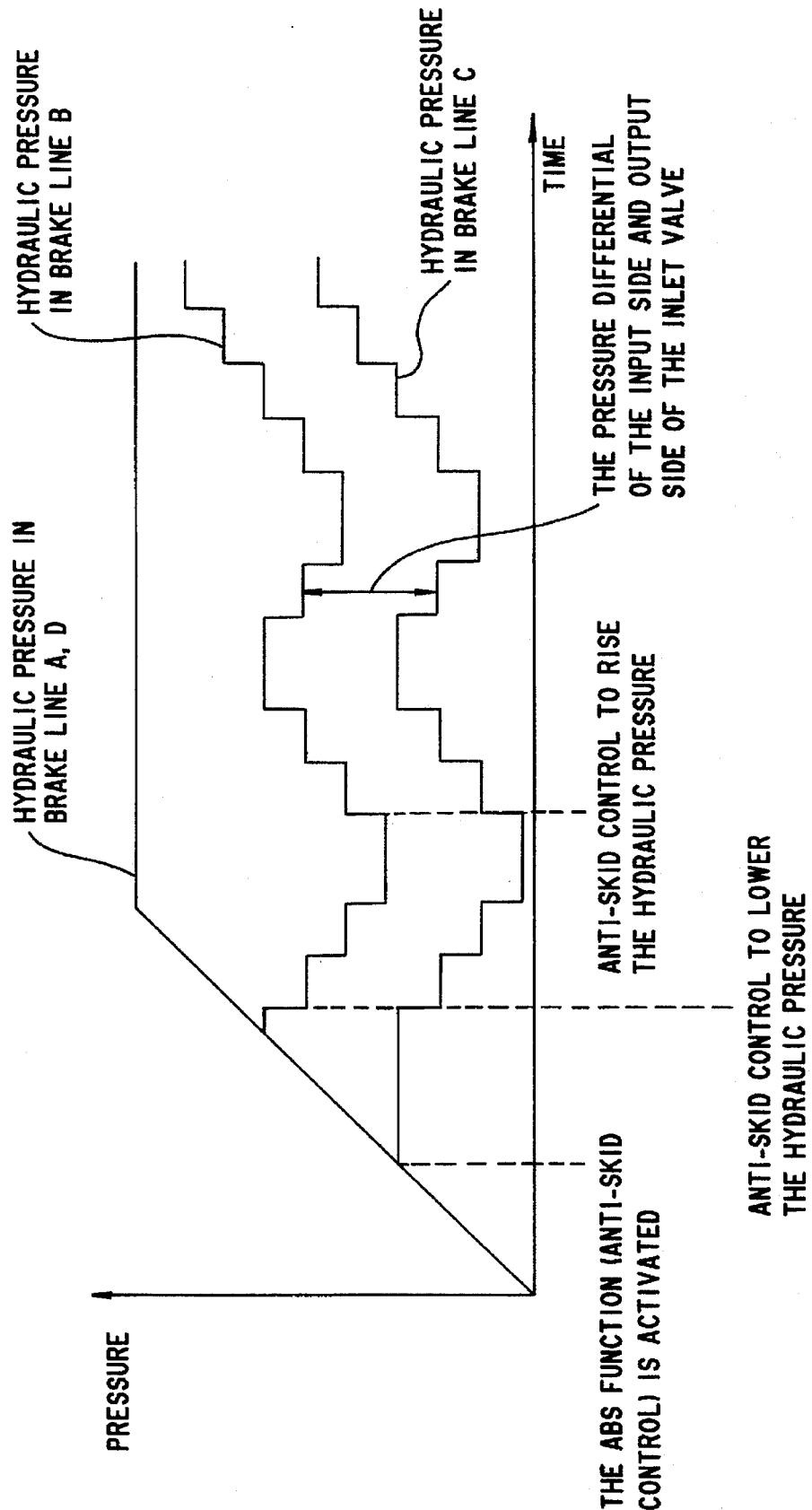
FIG. 2 is an explanatory diagram of the hydraulic pressure changes in the brake lines.

In the brake pressure generating assembly 2, as shown in FIG. 1, when the brake pedal 11 is pressed and braking proceeds normally, brake pressure is supplied through the master cylinder 12, brake line A, pressure regulator valve 4, brake line B, inlet valve 21, and brake line C to the wheel cylinder 14.

In the anti-skid state, with the action of the inlet valve 21, outlet valve 22, and pump 23, brake pressure is supplied from the wheel cylinder 14 through brake line C and outlet valve 22 to the auxiliary reservoir 24; and is supplied to each wheel cylinder 14 by means of the pump 23, brake line D, pressure regulator valve 4, brake line B, inlet valve 21, and brake line C. This repeated supply and discharge of brake pressure to and from the wheel cylinder 14 controls the braking process.

Pressure regulator valve 4 is configured from a piston 42 positioned inside the valve cylinder 41 connected to brake lines A and D. One end of piston 42 has a valve arrangement 46 that faces brake line B. The valve arrangement 46 includes a valve seat 43 and a valve, and functions to open and close access of brake line B to brake lines A and D. The other end of piston 42 is sealed tightly with seal 47, and faces brake line C through orifice E. Piston 42 is energized by spring 45 in the direction of the valve seat 43, and normally abuts against the protrusion 44 of valve seat 43. The relationship between the hydraulic pressure of brake lines B and C is determined by the pushing force of piston 42 pushing in the direction of lesser pressure as the hydraulic pressure in brake lines A and B act on either side of valve seat 43, and by the resultant force of the spring 45 and the pushing force of piston 42 pushing in the direction of lesser pressure as the hydraulic pressure in brake lines B and C act on either side of the seal 47. Moreover, the pressure differential of the hydraulic pressure of brake line B and brake line C relative to the pressure of the master cylinder can be set to be constant or proportional by the configuration of the valve seat 43, seal 47 and piston 42 of the pressure regulator valve 4. Orifice E, set between brake line C and pressure regulator valve 4, will enable adjustment of the pulses transmitted to the master cylinder 12 and wheel cylinder 14.

Dumping chamber DC acts to minimize pulsation of the brake fluid.

Figure 4:
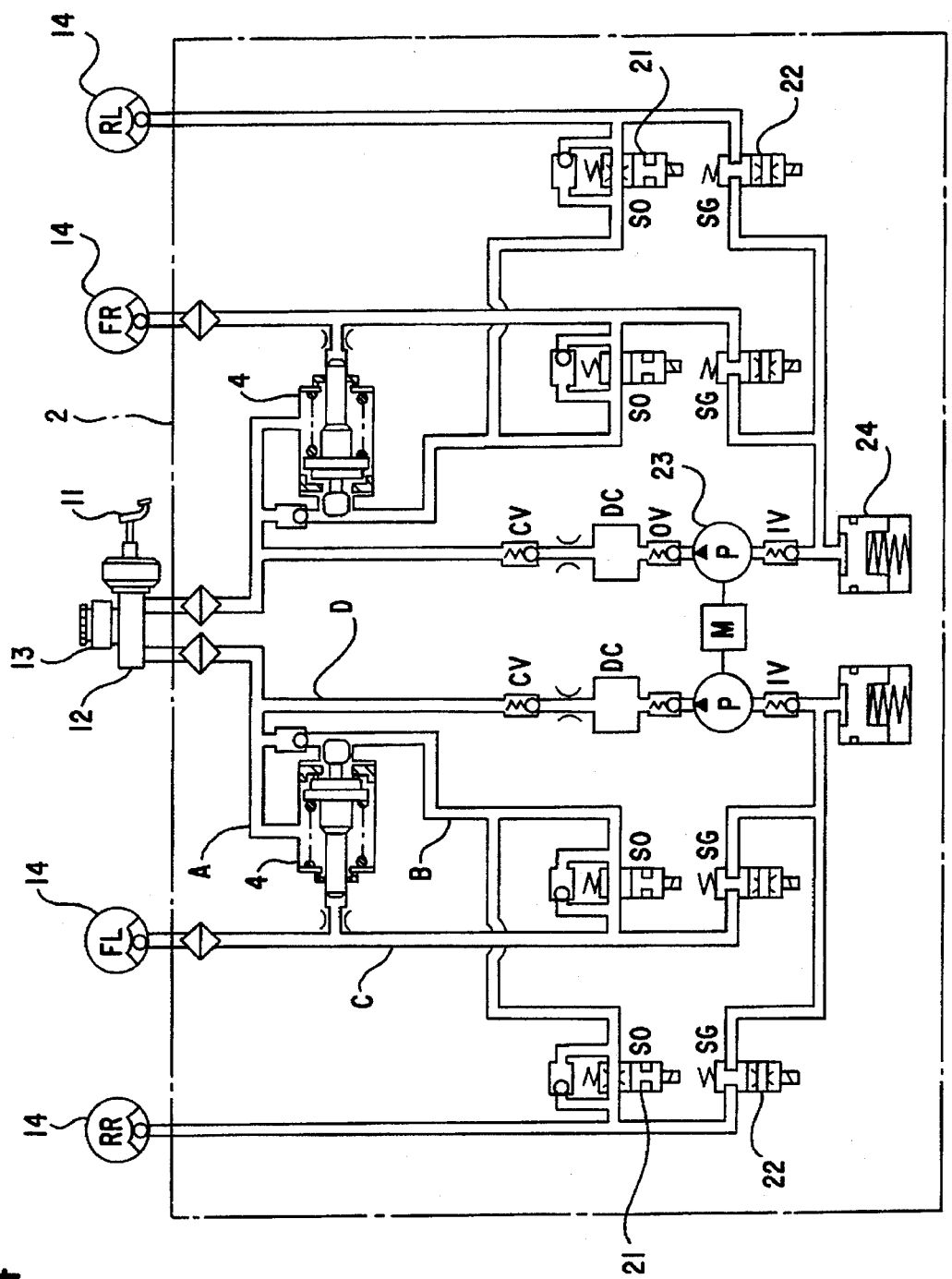
FIG. 4 is a layout diagram of the pressure regulator valves in brake lines connected in an X-configuration.
Figure 5:
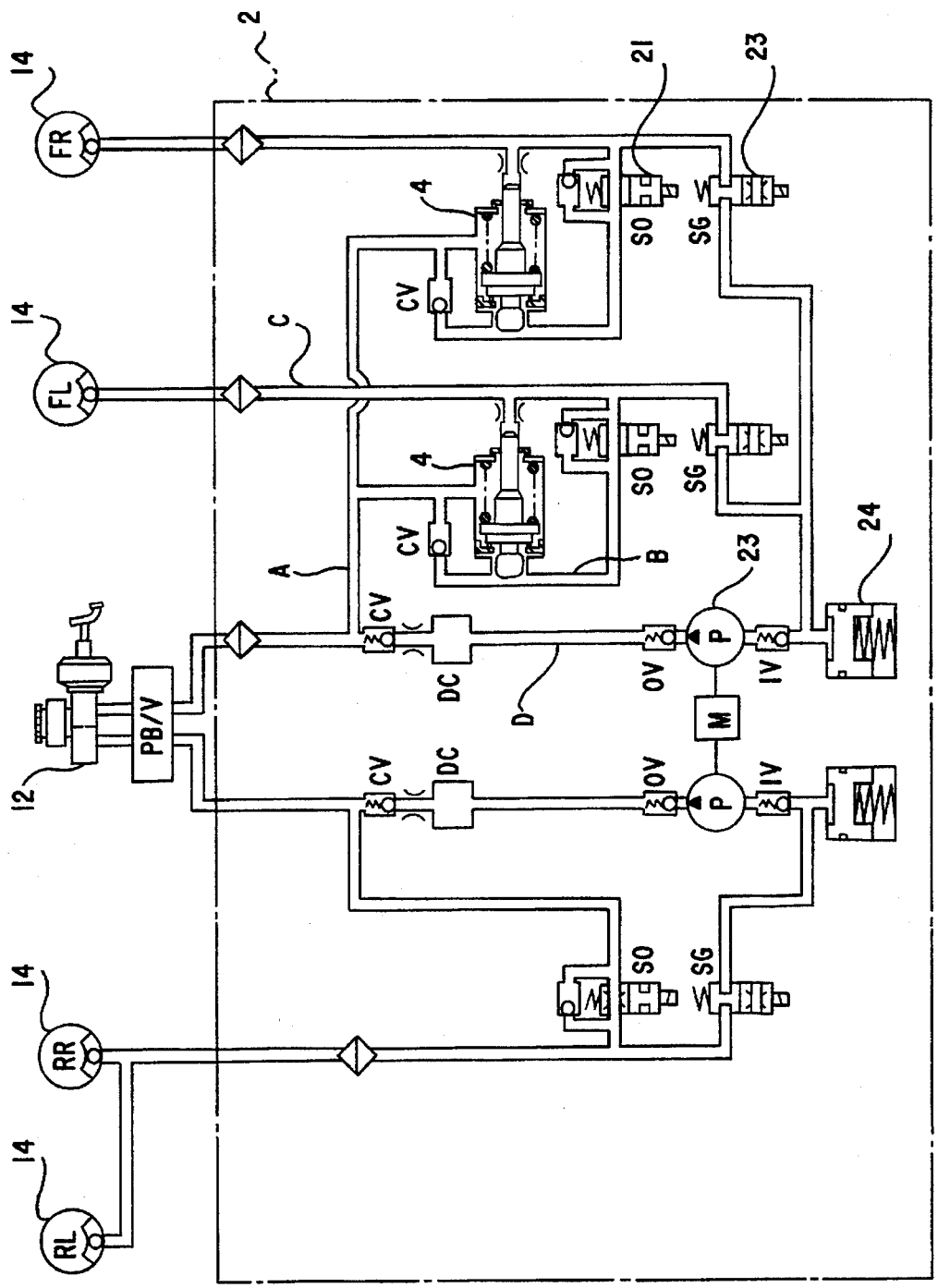
FIG. 5 is a layout diagram of the pressure regulator valves in brake lines connected in an H-configuration.
Figure 6:
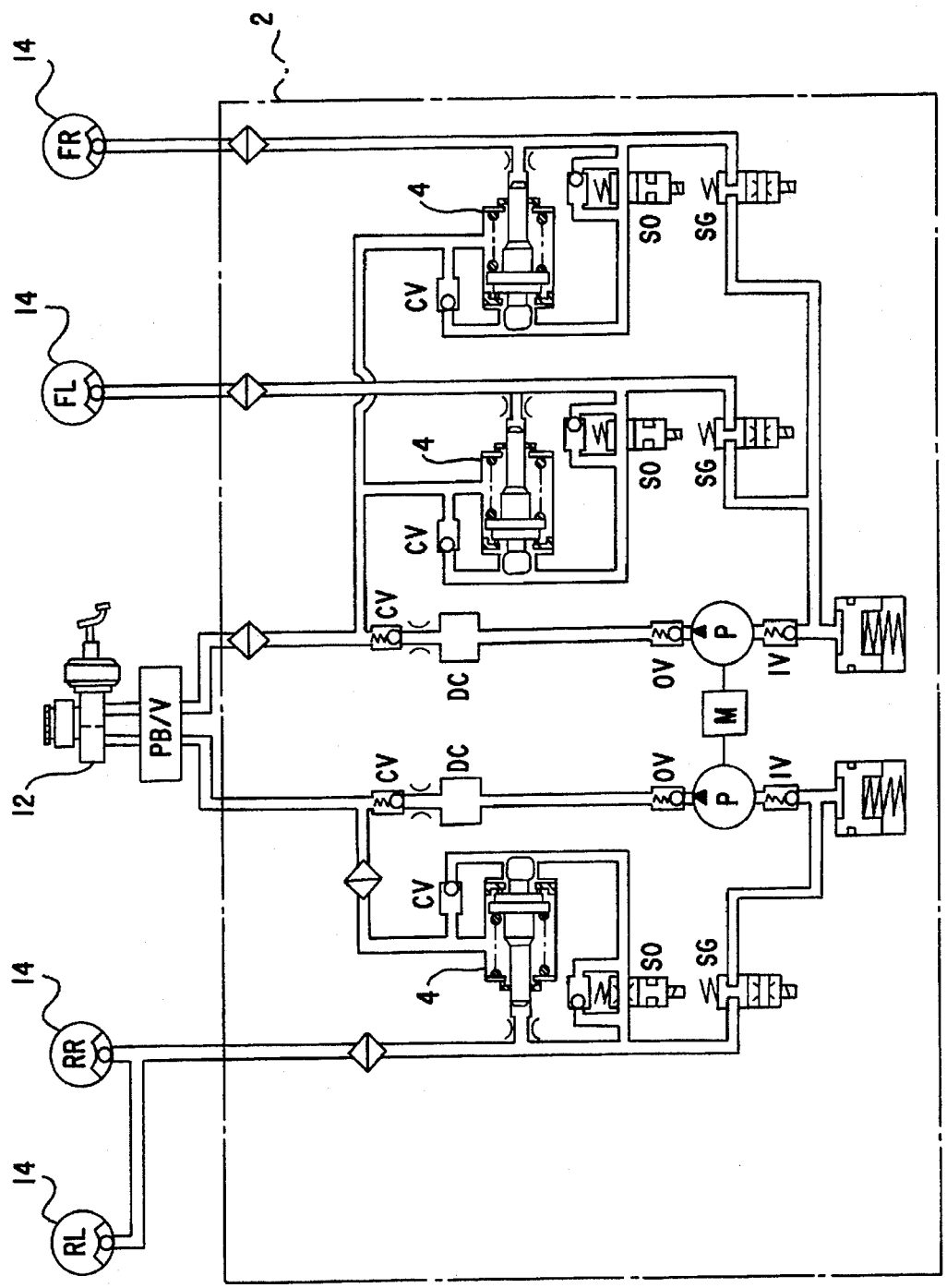
FIG. 6 is another layout diagram of the pressure regulator valves in brake lines connected in an H-configuration.

Examples of the positioning of pressure regulator valves 4 in all brake lines of the vehicle are shown in FIGS. 4–6. FIG. 4 illustrates one arrangement for brake lines connected in a X-configuration, where the pressure regulator valves 4 are arranged so as to reduce the hydraulic pressure of one line to act as a check on the brake pressure of the front wheels. FIG. 5 is for an H-configuration of brake lines in which a pressure regulator valve 4 is set for each of the left and right front wheels. FIG. 6 is for the same configuration as in FIG. 5 in which pressure regulator valves are set for the rear wheels as well.

Changes in the pressure of the brake lines are explained as follows: When the brake pedal 11 is pressed, the hydraulic pressure generated at the master cylinder 12 passes through brake lines A and D, pressure regulator valve 4, brake line B, inlet valve 21, and brake line C, wherein the hydraulic pressure in brake lines A–D rises. If the wheels are about to lock, as determined when a rate of deceleration of a wheel exceeds a threshold value, the ABS function (anti-skid control) is activated and the system enters the hold mode, wherein the inlet valve 21 closes to maintain the hydraulic pressure in brake line C. If the brake pedal is pushed harder, the hydraulic pressure in brake line A rises, and if the resultant pressure differential with brake line C exceeds a threshold value, then piston 42 inside the pressure regulator valve 4 acts to block passage between the inlet valve and the master cylinder 12. If the brake pedal is pushed even harder and the pressure in brake line A continues to rise, the pressure regulator valve 4 opens and closes (or remains closed), to maintain the pressure of brake line B in a range lower than that of brake line A. Next, as the pressure reduction mode is entered and the exit valve 22 opens to lower the hydraulic pressure in brake line C, then the pressure regulator valve 4 acts to maintain the pressure differential between brake line C and brake line B at the stipulated threshold ratio (or constant). This pressure differential between brake lines B and C can be set appropriately as a function of the type of vehicle, for example, between 10–20 kg/cm$^2$. The pressure regulator valve 4 acts in a similar manner when the pressure rises; therefore the pressure differential between brake lines B and C is kept within a small range to reduce the rate at which the pressure rises, thereby reducing noise and vibration from the valve action.

When the brake pedal is pressed during normal braking, the pressure in brake lines A–D rises. The orifices of brake lines A and C need not be of as small a diameter as in conventional devices, nor is it necessary to constrict the inner dimensions of the pressure regulator valve 4 and the inlet valve; therefore there is a quick pressure rise in the wheel cylinders 14 so as to provide better pedal responsiveness. This invention provides the following advantages.

1. The pressure differential of the input side and output side of the inlet valve is minimized to prevent noise and vibration associated with opening and closing of the inlet valve.
2. Pulsation between the inlet valve and the wheel cylinder is minimized.
3. Brake lines need not be highly constricted, giving better pedal responsiveness during normal braking.
4. The pressure regulator valve minimizes the pressure differential between the two sides of the inlet valve, thus minimizing the pressure boost in the wheel cylinder with one pulse of the inlet valve. This enables fine control of the pressure of the wheel cylinder as a function of the coefficient of friction μ of the road surface; in particular, braking control can be improved for a road surface with a low coefficient.

It is readily apparent that the above-described invention has the advantage of wide commercially utility. It is understood that the specific form of the invention hereinabove described is intended to be representative only, as certain modifications within the scope of these teachings will be apparent to those of skill in the art. Therefore, in determining the full scope of the invention, reference should only be made to the following claims.

We claim:

1. A vehicle anti-skid control device, comprising:
    master cylinder, said master cylinder providing hydraulic braking pressure based upon a pressure applied to a brake pedal coupled thereto;
    an inlet valve provided for each wheel of the vehicle for providing hydraulic braking pressure from the master cylinder to said each wheel of the vehicle;
    a wheel cylinder provided at said each wheel of the vehicle, for receiving the braking pressure from the inlet valve;
    a brake line for hydraulically connecting said master cylinder, said inlet valves, and said wheel cylinders;
    regulating means for regulating the hydraulic braking pressure from said master cylinder, said regulating means being configured to provide a pressure differential between an output side of said master cylinder and an input side of each of said inlet valves, thereby controlling the hydraulic braking pressure at each wheel cylinder,
    wherein said regulator means is configured to regulate the hydraulic braking pressure in said brake line such that the hydraulic braking pressure at the input side of said each of the inlet valves is higher than a pressure at the output side thereof, and is disposed in said brake line in series with the master cylinder and the inlet valves, and therebetween.

2. A vehicle anti-skid control device as recited in claim 1, wherein said regulator means is configured to operate only during anti-skid operation.

3. A vehicle anti-skid control device, comprising:
    a master cylinder, said master cylinder providing hydraulic braking pressure based upon a pressure applied to a brake pedal coupled thereto;
    an inlet valve provided for each wheel of the vehicle for providing hydraulic braking pressure from the master cylinder to said each wheel of the vehicle;
    a wheel cylinder provided at said each wheel of the vehicle, for receiving the braking pressure from the inlet valve;
    a brake line for hydraulically connecting said master cylinder, said inlet valves, and said wheel cylinders;
    a pressure regulator valve disposed in said brake line between said master cylinder and each of said inlet valves, said pressure regulator valve opening and closing to allow fluid flow through said brake line, said pressure regulator valve comprising a valve cylinder being connected to the output side of the master cylinder, and a piston, said piston forming a valve assembly and receiving the hydraulic braking pressure at one end thereof in parallel with the input side of at least one of said inlet valves, and another end of the piston receiving the hydraulic braking pressure in series with the wheel cylinder, wherein the valve assembly operates to open and close based upon a relationship between the hydraulic braking pressure of the master cylinder, the hydraulic braking pressure at the input side of at least one inlet valve, and the hydraulic braking pressure of the wheel cylinder, and wherein the pressure regulator valve generates a pressure differential between the output side of the master cylinder and the input side of the at least one inlet valve.

4. A vehicle anti-skid control device as recited in claim 3, wherein said pressure regulator valve is configured to operate only during anti-skid operation.

* * * * *